United States Patent
Kunimoto et al.

(10) Patent No.: US 10,921,923 B2
(45) Date of Patent: Feb. 16, 2021

(54) INFORMATION PROCESSING APPARATUS AND NON-TRANSITORY RECORDING MEDIUM STORING PROGRAM FOR CONTROLLING INFORMATION PROCESSING APPARATUS

(71) Applicant: BROTHER KOGYO KABUSHIKI KAISHA, Nagoya (JP)

(72) Inventors: Shintaro Kunimoto, Nagoya (JP); Ryoji Ban, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 44 days.

(21) Appl. No.: 15/420,141

(22) Filed: Jan. 31, 2017

(65) Prior Publication Data

US 2017/0285841 A1 Oct. 5, 2017

(30) Foreign Application Priority Data

Mar. 29, 2016 (JP) .................. 2016-066658

(51) Int. Cl.
*G06F 3/041* (2006.01)
*G06F 3/0484* (2013.01)
(Continued)

(52) U.S. Cl.
CPC ........ *G06F 3/0416* (2013.01); *G06F 3/04845* (2013.01); *G06F 3/04883* (2013.01);
(Continued)

(58) Field of Classification Search
CPC ............... G06F 3/0416; G06F 3/04845; G06F 3/04883; G06T 11/60; G06T 3/40
See application file for complete search history.

(56) References Cited

U.S. PATENT DOCUMENTS

2004/0021643 A1   2/2004 Hoshino et al.
2012/0030635 A1   2/2012 Miyazaki
(Continued)

FOREIGN PATENT DOCUMENTS

| CN | 102346639 A | 2/2012 |
| JP | 2004-070492 A | 3/2004 |
| JP | 2013-058149 A | 3/2013 |

OTHER PUBLICATIONS

Notice of Reasons for Rejection dated Oct. 15, 2019 received in Japanese Patent Application No. 2016-066658, together with a partial English language translation.
(Continued)

*Primary Examiner* — Roland J Casillas
(74) *Attorney, Agent, or Firm* — Scully, Scott, Murphy & Presser, PC

(57) ABSTRACT

There is provided a non-transitory recording medium storing a program for an information processing apparatus including a display and a touch panel. In a case that an indication object is in contact with or has approached a display range of the object image, the touch panel detects a contact strength of the indication object and a first indication position. In a case that the contact strength has exceeded a first threshold value, the display displays a first image representing at least one of multiple kinds of image processing. The computer accepts input designating the at least one of the multiple kinds of image processing in a state where the first image is displayed. The computer performs the at least one image processing designated by the input. The display displays an object image after being subjected to the at least one image processing designated by the input.

18 Claims, 14 Drawing Sheets

| SETTING CHANGE ACCEPTING AREA | SETTING VALUE |
|---|---|
| FIRST AREA A1 | LEFT ROTATION |
| SECOND AREA A2 | RIGHT ROTATION |

(51) Int. Cl.
*G06F 3/0488* (2013.01)
*G06T 3/40* (2006.01)
*G06T 11/60* (2006.01)

(52) U.S. Cl.
CPC ................ *G06T 3/40* (2013.01); *G06T 11/60*
(2013.01); *G06F 2203/04104* (2013.01); *G06F 2203/04105* (2013.01)

(56) References Cited

U.S. PATENT DOCUMENTS

| | | | | |
|---|---|---|---|---|
| 2014/0300569 | A1* | 10/2014 | Matsuki | G06F 3/041 345/173 |
| 2015/0067560 | A1* | 3/2015 | Cieplinski | G06F 3/04842 715/765 |
| 2015/0193912 | A1* | 7/2015 | Yuasa | G06F 3/14 345/659 |
| 2016/0259517 | A1* | 9/2016 | Butcher | G06F 3/0482 |
| 2016/0274686 | A1* | 9/2016 | Alonso Ruiz | G06F 3/04842 |
| 2016/0357367 | A1* | 12/2016 | Foster | G06F 3/0482 |

OTHER PUBLICATIONS

Official Action dated Nov. 26, 2020 received from the Chinese Patent Office in related application CN 201710046702.7 together with English language translation.

* cited by examiner

| SETTING CHANGE ACCEPTING AREA | SETTING VALUE |
|---|---|
| FIRST AREA A1 | LEFT ROTATION |
| SECOND AREA A2 | RIGHT ROTATION |

| SETTING CHANGE ACCEPTING AREA | SETTING VALUE |
|---|---|
| FIRST AREA A1 | ENLARGEMENT |
| SECOND AREA A2 | REDUCTION |

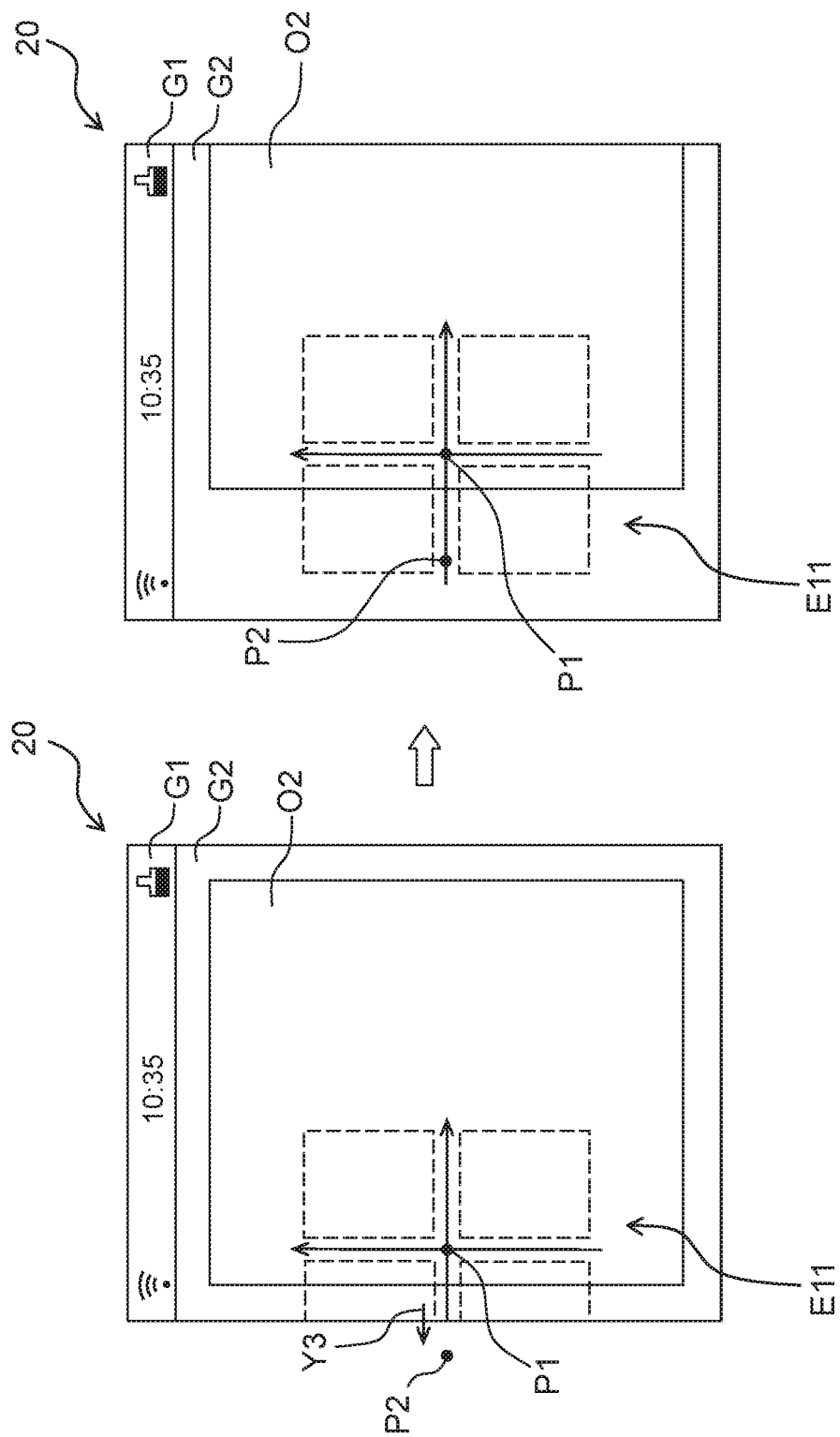

INFORMATION PROCESSING APPARATUS AND NON-TRANSITORY RECORDING MEDIUM STORING PROGRAM FOR CONTROLLING INFORMATION PROCESSING APPARATUS

CROSS REFERENCE TO RELATED APPLICATION

The present application claims priority from Japanese Patent Application No. 2016-066658 filed on Mar. 29, 2016, the disclosure of which is incorporated herein by reference in its entirety.

BACKGROUND

Field of the Invention

The present application relates to a program for displaying an image on a display and an information processing apparatus.

Description of the Related Art

There is conventionally known technology for executing processing of displaying an object image to be edited on a touch panel and enlarging the object image when the object image is touched or pressed under a constant pressure.

SUMMARY

After completion of the enlargement processing for the object image, a decision operation for saving the enlarged object image or a cancel operation for restoring the enlarged image to an original size is required to be input. In the conventional technology, the decision operation or the cancel operation is required to be input through a decision button or a cancel button. This increases the number of operations that need to be performed, resulting in a great operation burden on a user.

According to a first aspect of the present teaching, there is provided a non-transitory recording medium storing a program which is to be executed on a computer of an information processing apparatus including a display and a touch panel, wherein the program causes the computer to:
control the display to display an object image as an editing target;
in a case that an indication object is in contact with or has approached a display range of the object image, cause the touch panel to detect a contact strength of the indication object and a first indication position having accepted the contact or the approach of the indication object;
in a case that the touch panel has detected that the contact strength has exceeded a first threshold value, control the display to display a first image representing at least one of multiple kinds of image processing to be performed for the object image;
accept input designating the at least one of the multiple kinds of image processing in a state where the first image is displayed;
perform the at least one image processing designated by the input for the object image based on the accepted input; and
control the display to display an object image after being subjected to the at least one image processing designated by the input.

The program may be configured to cause the computer to detect whether or not a predefined operation has been input in a state where the contact or the approach of the indication object is being detected continuously; and
in a case that the input of the predefined operation has been detected and that the at least one image processing designated by the input has been performed, the program may cause the computer to control a storage section to store the object image after being subjected to the at least one image processing designated by the input.

In a case that the input of the predefined operation is not detected in the state where the first image is displayed, and that the contact or the approach of the indication object with respect to the touch panel is no longer detected, the program may cause the computer to control the display to eliminate the first image and the object image after being subjected to the at least one image processing designated by the input.

In the above configuration, the user may start image processing for the object image by bringing the indication object into contact with the touch panel under a contact strength exceeding the first threshold value. The user may input the operation for storing the object image after being subjected to the image processing by inputting the predefined operation while maintaining the contact of the indication object. The user may input the operation for eliminating the object image after being subjected to the image processing by separating the indication object from the touch panel without inputting the predefined operation. In other words, the information processing apparatus may accept input of the start operation, decision operation, and cancel operation for the image processing during a series of operations starting from contact of the indication object and ended with separation of the indication object. This reduces an operation burden on the user as compared with a case in which input of the decision operation or the cancel operation is accepted through a button image. Thus, the user may input the operation easily and conveniently.

According to a second aspect of the present teaching, there is provided a non-transitory recording medium storing a program which is to be executed on a computer of an information processing apparatus including a display and a touch panel, wherein the program causes the computer to:
control the display to display an object image as an editing target and a first image through which input designating at least one of multiple kinds of image processing to be performed for the object image is accepted;
in a case that an indication object is in contact with or has approached a display range of the first image, control the touch panel to detect a contact strength of the indication object and a first indication position having accepted the contact or the approach of the indication object;
in a case that the touch panel has detected that the contact strength has exceeded a first threshold value, accept the input designating at least one of the multiple kinds of image processing;
perform the at least one image processing designated by the input for the object image based on the accepted input; and
control the display to display an object image after being subjected to the at least one image processing designated by the input.

The program may be configured to cause the computer to detect whether or not a predefined operation has been input; and in a case that the input of the predefined operation has been detected and that the at least one image processing designated by the input has been performed, the program may cause the computer to control a storage section to store the object image after being subjected to the at least one image processing designated by the input.

In a case that the input of the predefined operation is not detected and that the contact or the approach of the indication object with respect to the touch panel is no longer detected, the program may cause the computer to control the display to eliminate the object image after being subjected to the at least one image processing designated by the input.

In the above configuration, the user may start image processing for the object image by bringing the indication object into contact with the touch panel under a contact strength exceeding the first threshold value. The user may input the operation for storing the object image after being subjected to the image processing by inputting the predefined operation while maintaining the contact of the indication object. The user may input the operation for eliminating the object image after being subjected to the image processing by separating the indication object from the touch panel without inputting the predefined operation. In other words, the information processing apparatus may accept input of the start operation, decision operation, and cancel operation for the image processing during a series of operations starting from contact of the indication object and ended with separation of the indication object.

BRIEF DESCRIPTION OF THE DRAWINGS

FIG. 17 depicts an exemplary display screen.

DESCRIPTION OF THE EMBODIMENTS

First Embodiment

Figure 1:
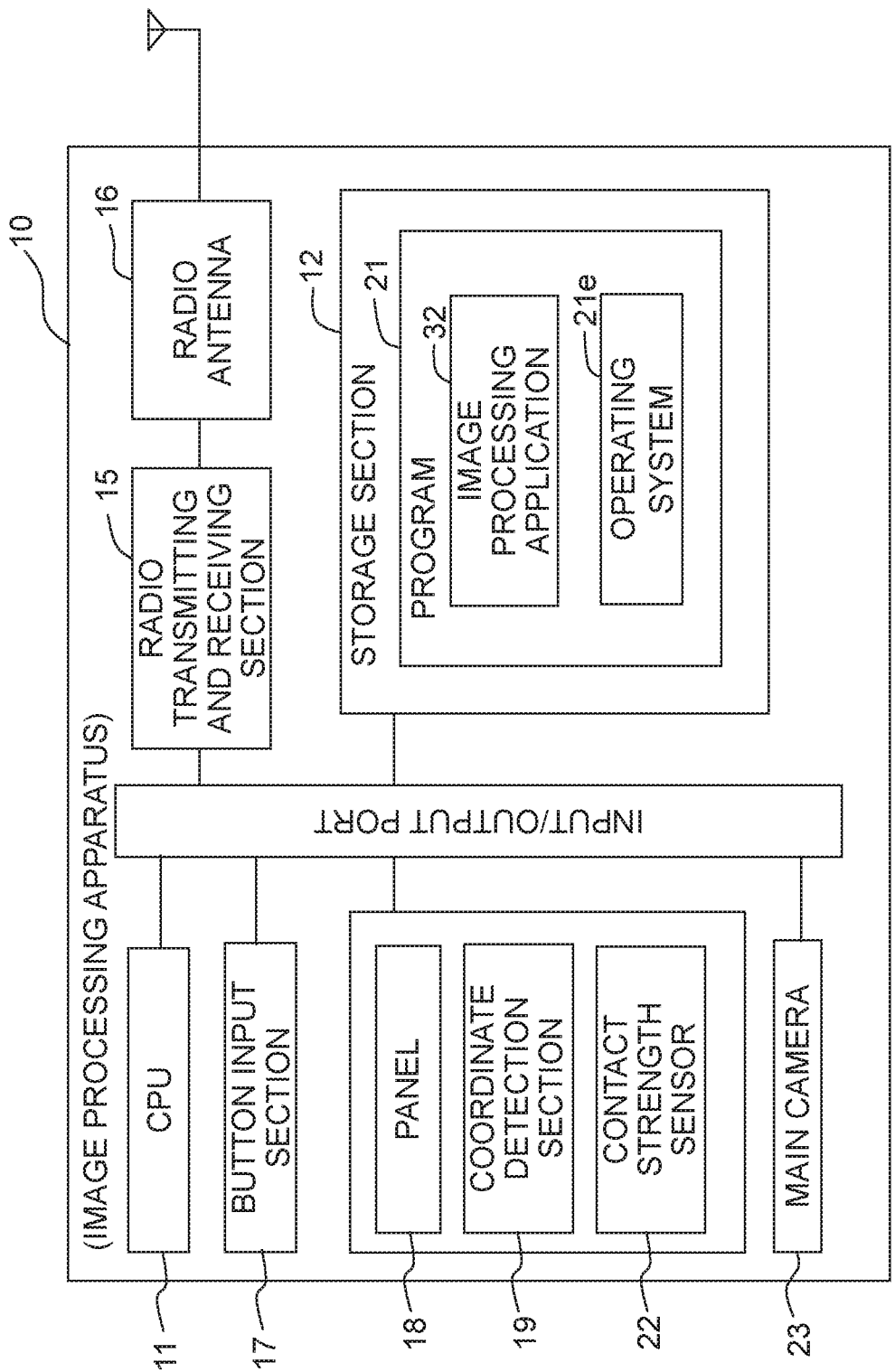
FIG. 1 is a block diagram of an information processing apparatus.

FIG. 1 is a block diagram of an information processing apparatus 10 that is an example of a first embodiment. As depicted in FIG. 1, the information processing apparatus 10 mainly includes a CPU 11, a storage section 12, a radio transmitting and receiving section 15, a radio antenna 16, a button input section 17, a panel 18, a coordinate detection section 19, a contact strength sensor 22, and a main camera 23. Examples of the information processing apparatus 10 include smart phones, tablets, cellular phones, and personal computers.

The button input section 17 accepts an operation that is performed by a user of the information processing apparatus 10. The button input section 17 is exemplified by a keyboard. The panel 18 displays a variety of functional information of the information processing apparatus 10. The coordinate detection section 19 detects and outputs an indication coordinate that is a coordinate indicating a position where an indication object (e.g., the tip of a finger of the user) is in contact with a display area of the panel 18. The coordinate detection section 19 configured integrally with the panel 18 functions as the touch panel 20. The coordinate detection section 19 may detect indication coordinates at the same time. The radio transmitting and receiving section 15 performs radio communication via the radio antenna 16 based on telecommunication standards of cellular phones and wireless communication standards of wireless LAN. The contact strength sensor 22 is used to measure a contact strength (or pressure) on the touch panel 20. The contact strength sensor 22 outputs a first value when the contact strength is smaller than a first threshold value. The contact strength sensor 22 outputs a second value when the contact strength is greater than the first threshold value and smaller than a second threshold value. The contact strength sensor 22 outputs a third value when the contact strength is greater than the second threshold value. The contact strength sensor 22 is disposed integrally with or adjacent to the touch panel 20. The main camera 23 is built in the information processing apparatus 10.

The CPU 11 performs processing based on a program 21 in the storage section 12. In the following, in some cases, program names, such as an image processing application 32 and an operating system 21e, will be used to indicate the CPU 11 performing each of the programs. For example, the wording "the operating system 21e (does something)" means "the CPU 11 executing the operating system 21e (does something)" in some cases.

The storage section 12 is configured by combining a RAM, a ROM, a flash memory, a HDD, a buffer of the CPU 11, and the like. The storage section 12 stores the program 21. The program 21 includes the operating system 21e and the image processing application 32. The operating system 21e is a program that provides a function to display various images on the panel 18 and basic functions used in the image processing application 32. Further, the operating system 21e provides Application Programming Interface (API) by which each application instructs each hardware to perform an operation. The image processing application 32 is available by installing it on the image processing apparatus 10.

<Operation of Information Processing Apparatus>

Figure 2:
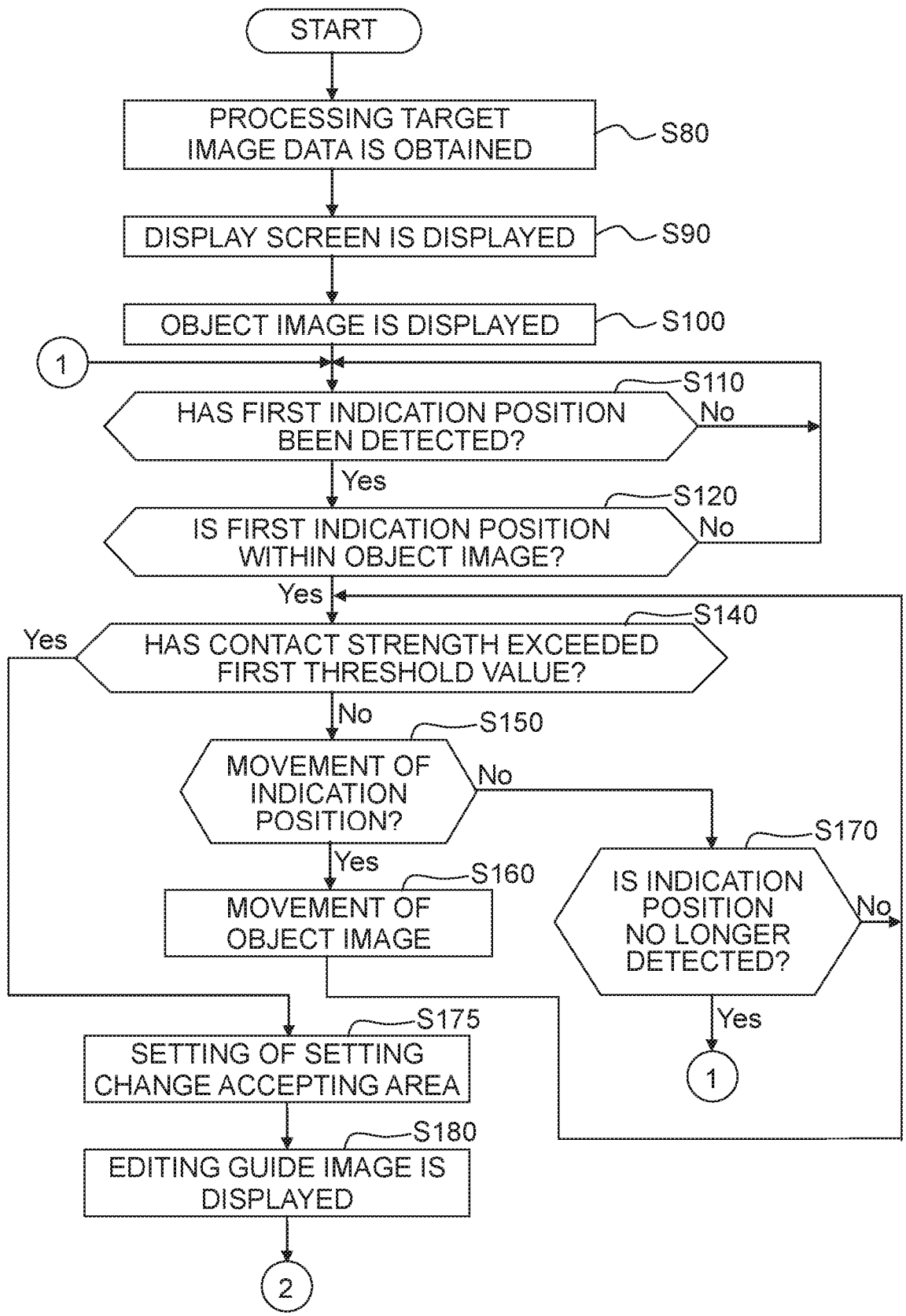
FIG. 2 is a flowchart indicating an operation of the information processing apparatus.

An operation of the information processing apparatus 10 according to the first embodiment will be explained with reference to the flowchart of FIG. 2. When the user inputs, through the button input section 17, an operation for starting or running the image processing application 32, the CPU 11 loads the image processing application 32 and starts overall control of the image processing apparatus 10. Accordingly, the flow of FIG. 2 is started.

In a step S80, the CPU 11 obtains image data to be processed that is a processing target (hereinafter, the image data to be processed is referred to as "processing target image data"). A variety of data may be used as the processing target image data. For example, the processing target image data may be generated by the image processing application 32, may be selected by the user from among multiple pieces of image data stored in the storage section 12, or may be image data of an image taken by the main camera 23.

Figure 5:
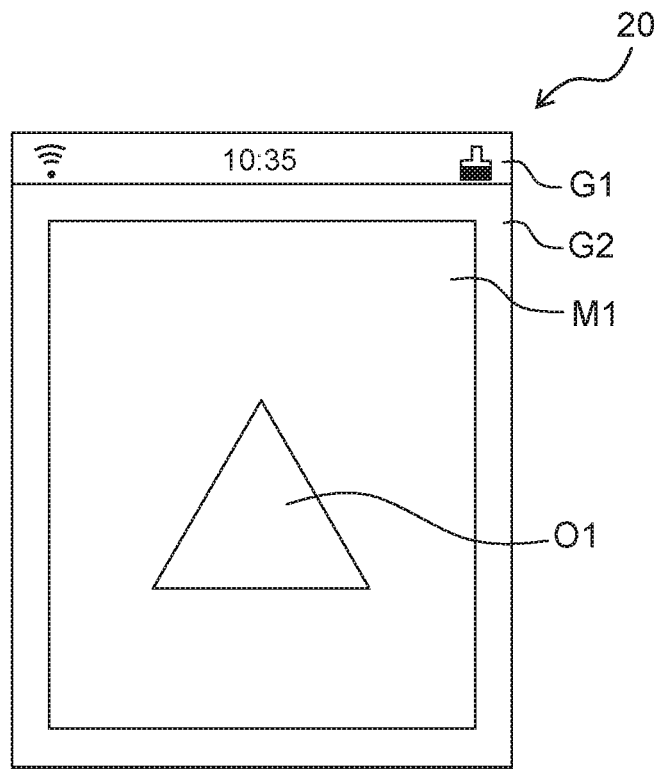
FIG. 5 depicts an exemplary display screen.

In a step S90, the CPU 11 controls the touch panel 20 to display a display screen thereon. FIG. 5 depicts an exemplary display screen. The display screen includes display areas G1 and G2. The display area G1 is an area in which various statuses, such as a remaining battery level, are displayed. The display area G2 is an area in which various images are displayed by the image processing application 32. In FIG. 5, an image to be processed M1 (hereinafter to be referred to as "processing target image M1") is displayed in the display area G2. The processing target image M1 is displayed based on the processing target image data.

In a step S100, the CPU 11 controls the touch panel 20 to display an object image in the processing target image M1. In FIG. 5, an object image O1 is displayed. The object image O1 is exemplified, for example, by a stamp image generated by the image processing application 32.

In a step S110, the CPU 11 determines whether or not the coordinate detection section 19 has detected a first indication position P1 in the display area G2. The determination is made by detecting whether or not the coordinate detection section 19 has output an indication coordinate. The first indication position P1 is a contact position of the indication object. The indication object is exemplified, for example, by the tip of a finger of the user and a stylus pen. Namely, the coordinate detection section 19 detects whether or not contact of the indication object with the panel 18 has been made. When the CPU 11 determines that no first indication position P1 has been detected (S110: NO), the CPU 11 returns to the step S110. When the CPU 11 determines that the first indication position P1 has been detected (S110: YES), the CPU 11 proceeds to a step S120.

In the step S120, the CPU 11 determines whether or not the detected first indication position P1 is within a display range of the object image. The determination is made by using a coordinate value of the first indication position P1 and a coordinate value of the object image. When the CPU 11 determines that the detected first indication position P1 is not within the display range of the object image (S120: NO), the CPU11 returns to the step S110. When the CPU 11 determines that the detected first indication position P1 is within the display range of the object image (S120: YES), the CPU11 proceeds to a step S140.

In the step S140, the CPU 11 determines whether or not a contact strength of the indication object has exceeded the first threshold value. In particular, the CPU 11 determines whether or not the contact strength sensor 22 has output the second value or the third value. When the CPU 11 determines that neither the second value nor the third value has been output (S140: NO), the CPU11 proceeds to a step S150.

In a step S150, the CPU 11 determines whether or not an operation for moving the object image has been input. In particular, the CPU 11 determines whether or not movement of the indication position to a third indication position has been detected in a state where the contact strength is smaller than the first threshold value and the indication object is in contact with the touch panel. The determination is made by detecting whether or not the indication coordinate output from the coordinate detecting part 19 has changed in a state where the first value is being output from the contact strength sensor 22. For example, when the operation for moving the indication object to the third indication position has been input in the state where the indication object is in contact with the object image (called a drag operation), the CPU 11 determines in the step S150 that the operation for moving the object image has been input (S150: YES). Then, the CPU11 proceeds to a step S160.

In the step S160, the CPU 11 controls the touch panel 20 to move the object image to a position based on the third indication position. Then, the CPU11 returns to the step S140. Accordingly, the object image is moved to track or follow the drag operation.

When the CPU 11 determines in the step S150 that the operation for moving the object image has not been input (S150: NO), the CPU11 proceeds to a step S170. In the step S170, the CPU 11 determines whether or not the indication position is no longer detected. The determination is made by detecting whether or not the indication coordinate is no longer output from the coordinate detection section 19. When the CPU 11 determines that the indication position is still detected (S170: NO), the CPU 11 returns to the step S140. When the CPU 11 determines that the indication position is no longer detected (S170: YES), the CPU determines that the indication object has no contact with the surface of the touch panel 20 and returns to the step S110.

Figures 9A, 9B, 9C:
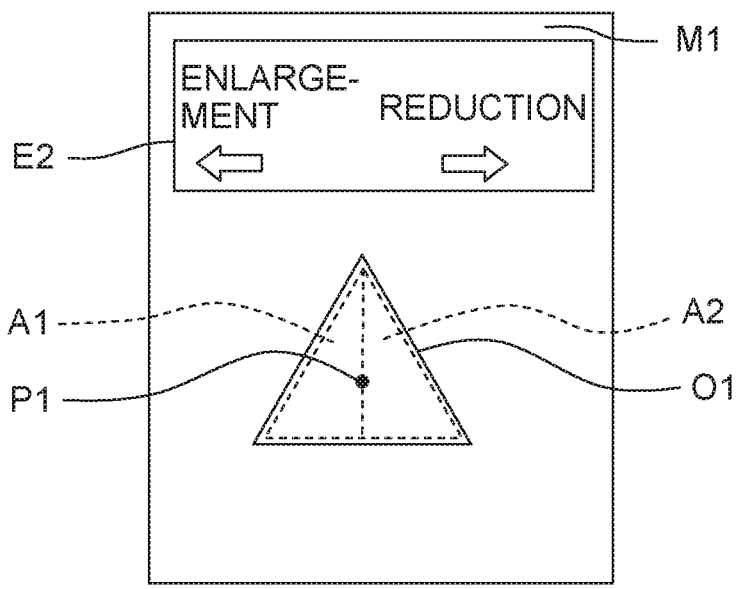
FIG. 9A depicts an exemplary display screen.
FIG. 9B depicts an exemplary setting table.
FIG. 9C depicts an exemplary setting table.

When the CPU 11 determines that the contact strength of the indication object has exceeded the first threshold value (S140: YES), the CPU 11 proceeds to a step S175. In the step S175, the CPU 11 sets an area for accepting setting change (hereinafter referred to as "setting change accepting area"). Details thereof will be described with reference to FIG. 6. First, in an area surrounding the first indication position P1, a first area A1 and a second area A2 are set as the setting change accepting areas. The first area A1 and the second area A2 are set in the display range of the object image O1. The areas A1 and A2 may be separated with a virtual boundary line invisible to the user. The storage section 12 stores a setting table TB1. The setting table TB1 is an area storing correspondence relations between the setting change accepting areas and various setting values. FIG. 9B depicts an exemplary setting table TB1 for the example of FIG. 6. As depicted in FIG. 9B, the first area A1 corresponds to a setting value "left rotation" for the image processing of "rotation", and the second area A2 corresponds to a setting value "right rotation" for the image processing of "rotation".

Figure 6:
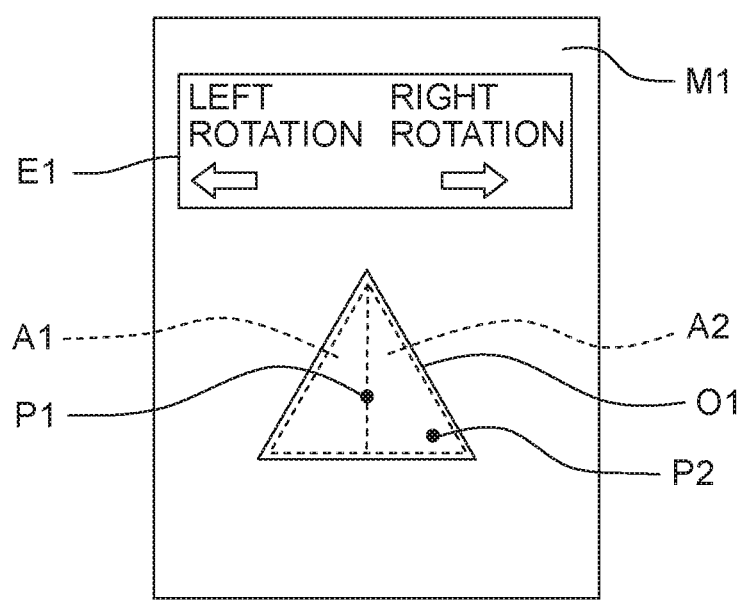
FIG. 6 depicts an exemplary display screen.

In a step S180, the CPU 11 controls the touch panel 20 to display an editing guide image in any position within the processing target image M1. The editing guide image indicates kinds of image processing capable of being executed for the object image and setting values for image processing. In the example of the first embodiment, an editing guide image E1 is displayed as depicted in FIG. 6. Then, the CPU11 proceeds to a step S190.

In the step S190, the CPU 11 determines whether or not movement of the indication position has been detected. In particular, when a drag operation for moving the indication object to a second indication position has been input in the state where the indication object is in contact with the object image, the CPU determines in the step S190 that movement of the indication position has been detected. The determination is made by detecting whether or not the indication coordinate output from the coordinate detection section 19 has changed. When the CPU 11 determines that movement of the indication position has not been detected (S190: NO), the CPU11 proceeds to a step S270. When the CPU 11 determines that movement of the indication position has been detected (S190: YES), the CPU11 proceeds to a step S192.

In the step S192, the CPU 11 determines whether or not the second indication position is within the display range of the object image. The determination is made by using a coordinate value of the second indication position and a coordinate value of the object image. When the CPU determines that the second indication position is within the display range of the object image (S192: YES), the CPU11 proceeds to a step S200.

In the step S200, the CPU 11 performs image processing corresponding to an area that is within the display range of the object image and includes the second indication position. In the first embodiment, as depicted in FIG. 6, a case in which a second indication position P2 is within a display range of the second area A2 will be explained. The CPU 11 refers to a column of the second area A2 of the setting table TB1 depicted in FIG. 9B. The second area A2 corresponds to the setting value "right rotation" for the image processing of "rotation". Thus, image processing for turning the object image O1 right at a predefined speed is performed. The rotation may be made with the center position or the gravity center position of the object image O1 being as a rotational axis.

Figure 7:
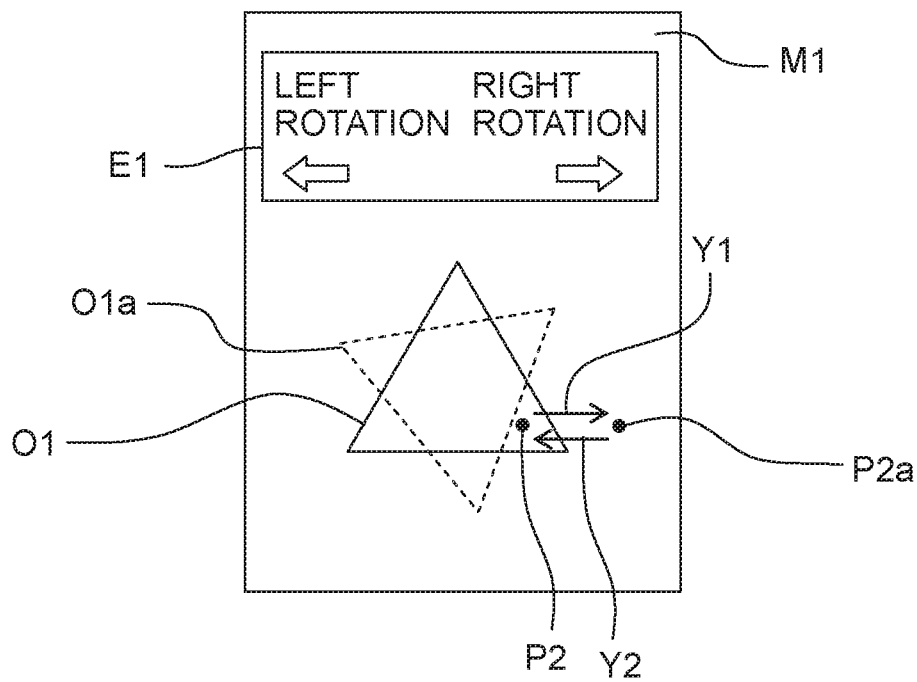
FIG. 7 depicts an exemplary display screen.

In the step S210, the CPU 11 controls the touch panel 20 to display, in the processing target image M1, an object image after processing that is an object image after being subject to the image processing. Then, the CPU11 proceeds to a step S270. The object image after processing may be displayed to overlap with the object image before processing. The object image after processing may be displayed, for example, translucently so that comparison between the object image after processing and the object image before processing is easily made. In the first embodiment, as depicted in FIG. 7, an object image after processing O1a is displayed to overlap with the object image before processing O1. Further, the object image after processing O1a is displayed translucently. This enables the user to figure out a condition after image processing, and thus the user may perform editing easily and conveniently.

When the CPU 11 determines in the step S192 that the second indication position is not within the display range of the object image (S192: NO), the CPU11 proceeds to a step S230. In the step S230, the CPU 11 stops image processing being executed in the step S200.

In the first embodiment, as depicted in FIG. 7, a case in which the second indication position P2 moves to a second indication position P2a will be described (see an arrow Y1 in FIG. 7). The second indication position P2a is out of the display range of the object image O1. Thus, the CPU 11 stops the image processing for turning the object image O1 right.

In a step S240, the CPU 11 determines whether or not the indication position is no longer detected. The determination is made by detecting whether or not the indication coordinate is no longer output from the coordinate detection section 19. When the CPU 11 determines that the indication position is no longer detected (S240: YES), the CPU 11 determines that the indication object has no contact with the surface of the touch panel 20 and the CPU11 proceeds to a step S280. When the CPU 11 determines that the indication position is still detected (S240: NO), the CPU11 proceeds to a step S250.

In the step S250, the CPU 11 determines whether or not the indication position has been detected within the display range of the object image. The determination is made by using a coordinate value of the indication position and a coordinate value of the object image. When the CPU 11 determines that the indication position has not been detected within the display range (S250: NO), the CPU 11 returns to the step S240. When the CPU 11 determines that the indication position has been detected within the display range (S250: YES), the CPU11 proceeds to a step S260.

In the step S260, the CPU 11 performs image processing corresponding to an area that is within the display range of the object image and includes the indication position detected in the step S250. This processing is the same as the step S200, and thus any explanation thereof will be omitted. In the step S260, the CPU 11 restarts the image processing stopped in the step S230 and proceeds to the step S270. In the first embodiment, as depicted in FIG. 7, a case in which the second indication position P2a moves to the second indication position P2 (see an arrow Y2 in FIG. 7) will be described. The second indication position P2 is positioned within the display range of the second area A2 as well as the display range of the object image O1. Thus, the image processing for turning the object image O1 right is restarted.

In the step S270, the CPU 11 determines whether or not the indication position is no longer detected. The determination is made by detecting whether or not the indication coordinate is no longer output from the coordinate detection section 19. When the CPU 11 determines that the indication position is no longer detected (S270: YES), the CPU11 proceeds to the step S280. In the step S280, the CPU 11 controls the touch panel 20 to delete the object image after processing. Thus, only the object image before image processing is displayed in the processing target image M1. In the first embodiment, the CPU 11 controls the touch panel 20 to delete the object image after processing O1a in FIG. 7, and returns to the display mode depicted in FIG. 6.

In the step S290, the CPU 11 controls the touch panel 20 to delete the editing guide image displayed in the step S180. In the first embodiment, the CPU 11 controls the touch panel 20 to delete the editing guide image E1 in FIG. 6, and returns to the display mode depicted in FIG. 5. After that, the flowchart continuing from FIG. 2 ends.

When the CPU 11 determines that the indication position is still detected (S270: NO), the CPU11 proceeds to a step S300. In the step S300, the CPU 11 determines whether or not input of a predefined operation has been detected in a state where contact of the indication object has been continuously detected since contact of the indication object was detected in the step S110. In particular, the CPU 11 determines whether or not the contact strength has exceeded the second threshold value. The determination is made by detecting whether or not the third value has been output from the contact strength sensor 22. The second threshold value is greater than the first threshold value. When the CPU 11 determines that input of the predefined operation has not been detected (S300: NO), the CPU 11 returns to the step S190. When the CPU determines that input of the predefined operation has been detected (S300: YES), the CPU11 proceeds to a step S305.

In the step S305, the CPU 11 determines whether or not the indication position having accepted the predefined operation is different from the first indication position detected in the step S110. The determination is made by using a coordinate value of the first indication position and a coordinate value of the indication position having accepted the predefined operation. When the CPU 11 determines that the indication position having accepted the predefined operation is different from the first indication position detected in the step S110 (S305: YES), the CPU 11 proceeds to a step S310. In the step S310, the CPU 11 controls the storage section 12 to store the object image after image processing therein. Accordingly, the image processing performed for the object image is decided.

In a step S315, the CPU 11 controls the touch panel 20 to delete the object image before image processing. Further, the CPU 11 allows the object image after processing to be changed from the transparent mode to a normal mode. In a step S320, the CPU 11 controls the touch panel 20 to delete the editing guide image displayed in the step S180. Then, the flowchart continuing from FIG. 2 ends.

Figure 8:
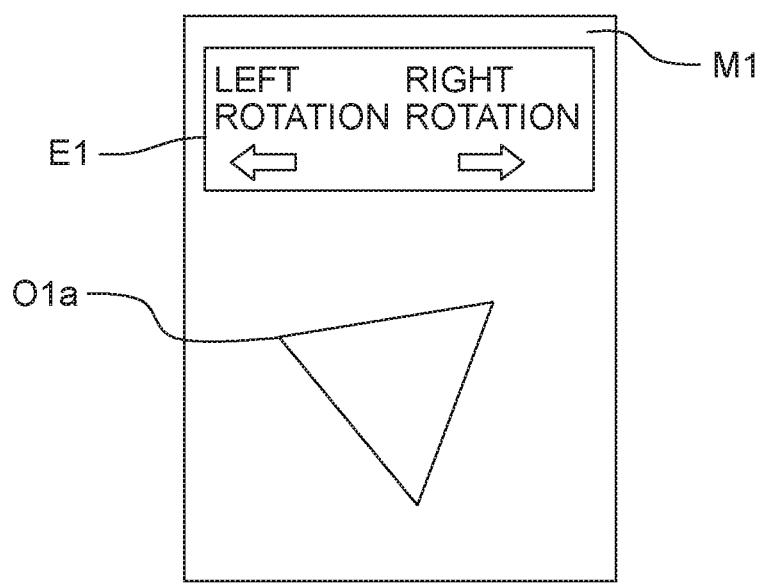
FIG. 8 depicts an exemplary display screen.

In the first embodiment, the CPU 11 controls the touch panel 20 to delete the object image O1 in the step S315 of FIG. 7 and allows the object image after processing O1a to be changed from the transparent mode to the normal mode. After that, the CPU 11 proceeds to a display mode depicted in FIG. 8.

When the CPU 11 determines that the indication position having accepted the predefined operation is not different from the first indication position detected in S110 (S305: NO), the CPU 11 proceeds to a step S330. In the step S330, the CPU 11 changes setting contents of the setting change accepting area. In particular, the CPU 11 changes kinds of image processing corresponding to the first area A1 and the second area A2. For example, the contents of the setting table TB1 may be changed to those of FIG. 9C. In a step S340, the CPU 11 controls the touch panel 20 to display, in the processing target image M1, an editing guide image indicating kinds of image processing after change.

In the first embodiment, as depicted in the setting table TB1 of FIG. 9C, the first area A1 corresponds to a setting value "enlargement" for image processing of "enlargement/reduction", which is the image processing after change in the first embodiment. The second area A2 corresponds to a setting value "reduction" for the image processing of "enlargement/reduction". Then, an editing guide image E2 indicating "enlargement/reduction", which is the image processing after change in the first embodiment, is displayed in the processing target image M1.

<Effect of First Embodiment>

The user may start image processing for the object image by bringing the indication object into contact with the object image under a contact strength exceeding the first threshold value (S140: YES). The user may perform, for the object image, image processing (S200) corresponding to an area that is within a display range of the object image and includes the second indication position through the drag operation in which the indication object is moved to the second indication position while the contact of the indication object with the touch panel 20 is maintained (S190: YES). The user may store the object image after image processing in the storage section 12 (S310) by allowing the indication object to touch the touch panel 20 (S300: YES) until the contact strength exceeds the second threshold value while maintaining the contact of the indication object with the touch panel 20. The user may decide the image processing for the object image, accordingly. The user may display the object image before image processing on the touch panel 20 (S280) by separating the indication object from the touch panel 20 (S270: YES) after performing the image processing for the object image (S200), namely, by not allowing the indication object to touch the touch panel 20 until the contact strength exceeds the second threshold value (S300: NO). The user may cancel the image processing for the object image, accordingly. Namely, if once the user makes the indication object touch the touch panel 20, the user may perform the start operation, the decision operation, and the cancel operation for image processing while maintaining the contact of the indication object with the touch panel 20. In other words, the information processing apparatus 10 may accept input of the start operation (S110: YES), the decision operation (S300: YES), and the cancel operation (S270: YES in a state of S300: NO) for image processing during the series of operations starting from contact of the indication object and ended with separation of the indication object. This reduces an operation burden on the user as compared with a case in which input of the decision operation or the cancel operation is accepted through the button image. This is because, when input of the decision operation or the cancel operation is accepted through the button image, the user typically needs the following steps of: allowing the indication object to touch the touch panel 20 so as to perform image processing; separating the indication object from the touch panel 20; and allowing the indication object to touch the touch panel 20 so as to select any of the button images.

The user may move the object image (S160) by moving the indication object (S150: YES) while bringing the indication object into contact with the object image under a contact strength not exceeding the first threshold value (S140: NO). In other words, the information processing apparatus 10 may accept input of movement operation (S150: YES in a state of S140: NO) of the object image during the series of operations starting from contact of the indication object and ended with separation of the indication object. This enables the user to input the operation easily and conveniently.

The user may perform image processing corresponding to the first area A1 (e.g., "left rotation") by bringing the indication object into contact with the object image under a contact strength exceeding the first threshold value (S140: YES) and moving the indication object to the first area A1 (S190: YES) while maintaining the contact of the indication object with the touch panel 20. Similarly, the user may perform image processing corresponding to the second area A2 (e.g., "right rotation") by moving the indication object to the second area A2 (S190: YES). Accordingly, the user may select an appropriate kind of image processing from among multiple kinds of image processing (S190: YES), perform image processing (S200), and perform the decision operation (S300: YES) or the cancel operation (S270: YES in a state of S300: NO), without separating the indication object from the touch panel 20 even once (S110: YES). In other words, the information processing apparatus 10 may select an appropriate kind of image processing from among multiple kinds of image processing during the series of operations starting from contact of the indication object and ended with separation of the indication object. This enables the user to input the operation easily and conveniently.

The user may switch multiple kinds of selectable image processing (S330) by allowing the indication object to touch the first indication position P1 within the object image under a contact strength exceeding the first threshold value (S140: YES) and allowing the indication object to touch the first indication position P1 under a contact strength exceeding the second threshold value (S300: YES) without moving the indication object (S305: NO). In other words, the information processing apparatus 10 may accept input of the operation for switching multiple kinds of selectable image processing (S330) during the series of operations starting from contact of the indication object and ended with separation of the indication object. Namely, when the user starts image processing by touching the first indication position P1 within the object image strongly (S140: YES), and when the user desires to change the kind of image processing, the user is only required to touch the first indication position P1 continuously and more strongly (S300: YES and S305 NO). This enables the user to input the operation easily and conveniently.

The user may stop image processing (S230) by moving the indication object to the outside of the display range of the object image (S192: NO) while maintaining the contact of the indication object with the touch panel 20 during a period in which the object image is being subjected to image processing (S200). After that, the user may restart the image processing corresponding to the first area A1 or the second area A2 (S260) by moving the indication object from the outside of display area of the object image to the first area A1 or the second area A2 (S250: YES) while maintaining the contact of the indication object with the touch panel 20. In other words, the information processing apparatus 10 may accept input of the operation for temporarily stopping image processing (S192: NO) and the operation for restarting the temporarily stopped image processing (S250: YES) during the series of operations starting from contact of the indication object and ended with separation of the indication object. This enables the user to input the operation easily and conveniently.

Second Embodiment

Figure 3:
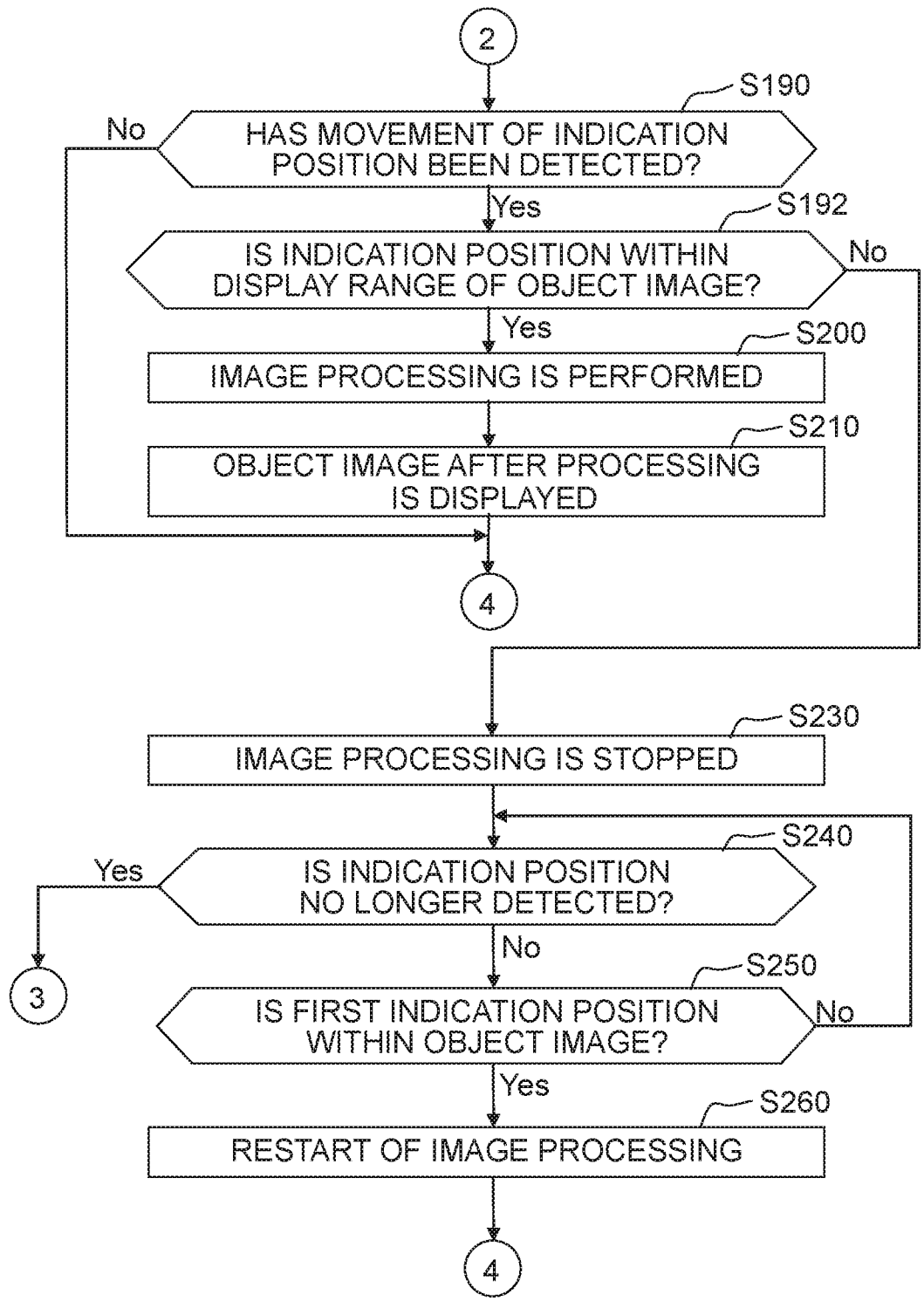
FIG. 3 is a flowchart indicating a continuation of the operation of the information processing apparatus.
Figure 4:
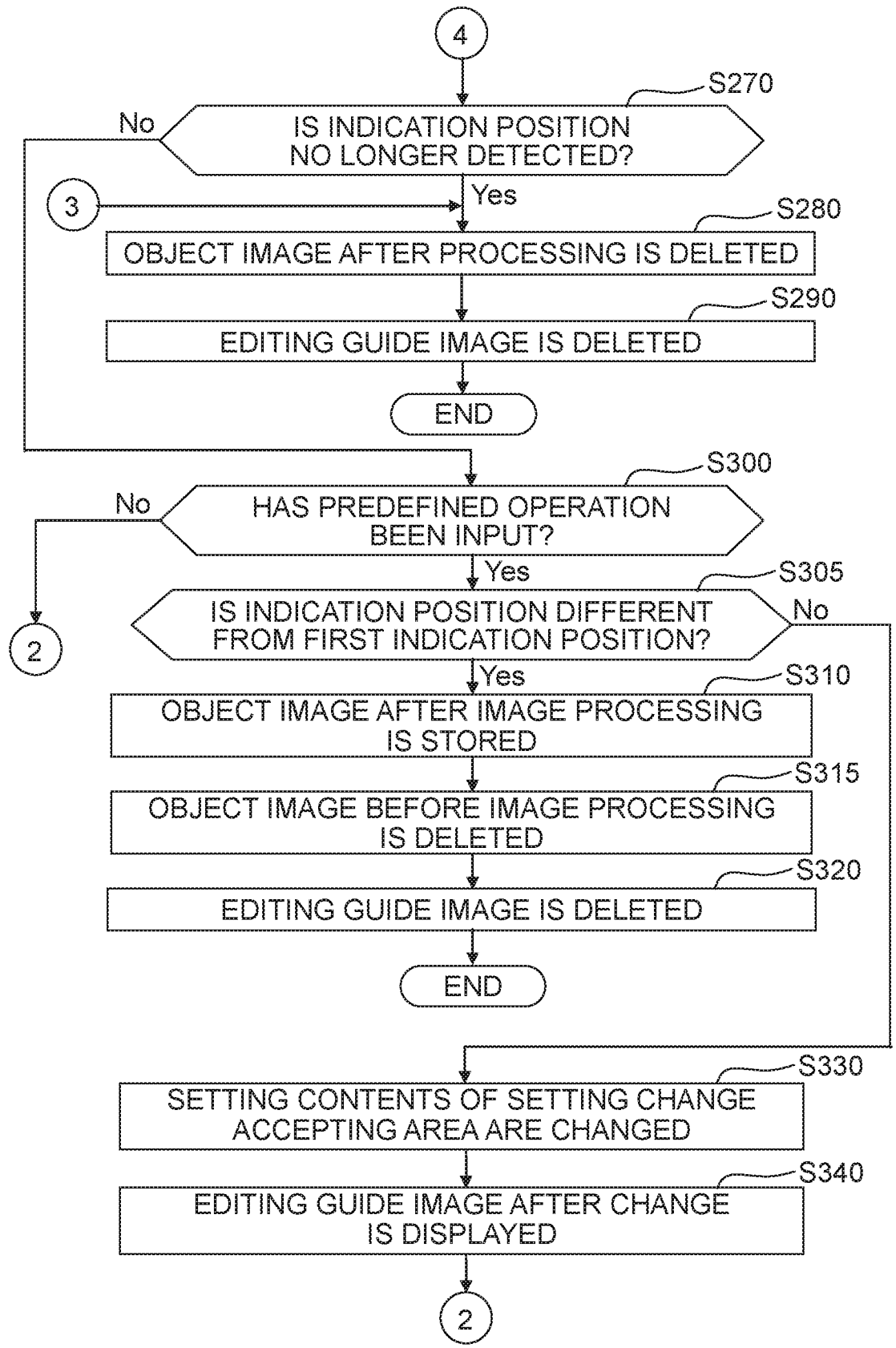
FIG. 4 is a flowchart indicating a continuation of the operation of the information processing apparatus.

The second embodiment provides display modes of the object image and the editing guide image that are different from those of the first embodiment. The block diagram of the information processing apparatus 10 (FIG. 1) and the flow-chart (FIGS. 2 to 4) are common to the first embodiment and the second embodiment, any detailed explanation thereof will be omitted.

Figure 10:
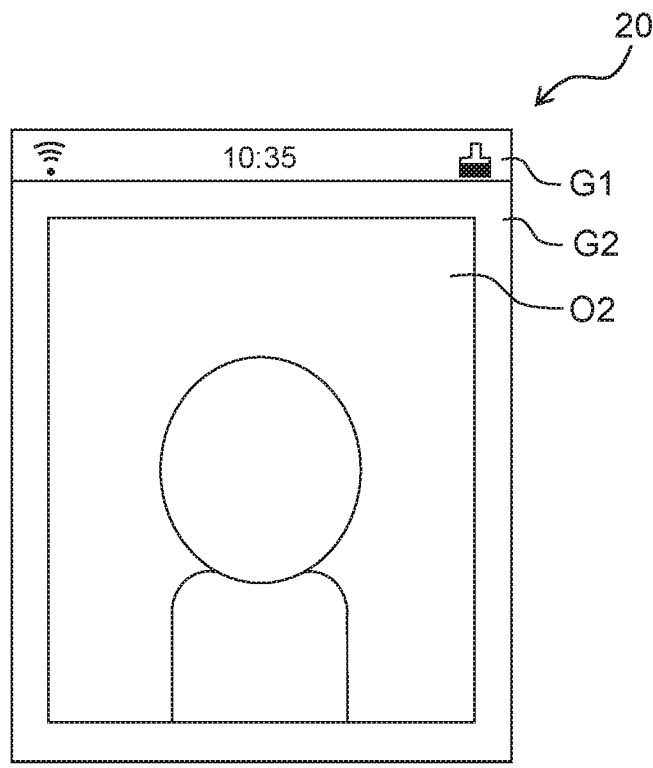
FIG. 10 depicts an exemplary display screen.

In the step S100, the object image is displayed. In the second embodiment, the entire area of the processing target image displayed in the display area G2 is regarded as the object image. In an example depicted in FIG. 10, an object image O2 is displayed in the display area G2. The object image O2 may be, for example, an image taken by the main camera 23 or an image that is selected by the user from among images stored in the storage section 12.

In the step S175, the CPU 11 sets the setting change accepting area. In the step S180, the CPU 11 controls the touch panel 20 to display an editing guide image E11 in the object image O2. A detailed explanation thereof will be made with reference to FIG. 11. The editing guide image E11 includes an image of coordinate axes. The image of coordinate axes is provided with a vertical axis and a horizontal axis orthogonal to each other. The center point of the image of coordinate axes is coincident with the first indication position P1. The vertical axis corresponds to image processing for "brightness". The horizontal axis corresponds to image processing for "contrast". Accordingly, a first area A11, a second area A12, a third area A13, and a fourth area A4 are set in an area surrounding the first indication position P1. Namely, the image of coordinate axes represents boundary lines between the first area A11, the second area A12, the third area A3, and the fourth area A14. In particular, the first area A11 corresponds to a setting value "increase" of the image processing for "brightness" and a setting value "increase" of the image processing for "contrast". The second area A12 corresponds to the setting value "increase" of the image processing for "brightness" and a setting value "decrease" of the image processing for "contrast". The third area A13 corresponds to a setting value "decrease" of the image processing for "brightness" and the setting value "decrease" of the image processing for "contrast". The fourth area A14 corresponds to the setting value "decrease" of the image processing for "brightness" and the setting value "increase" of the image processing for "contrast". Those correspondence relations are stored in the setting table TB1 as described in the first embodiment.

Figure 11:
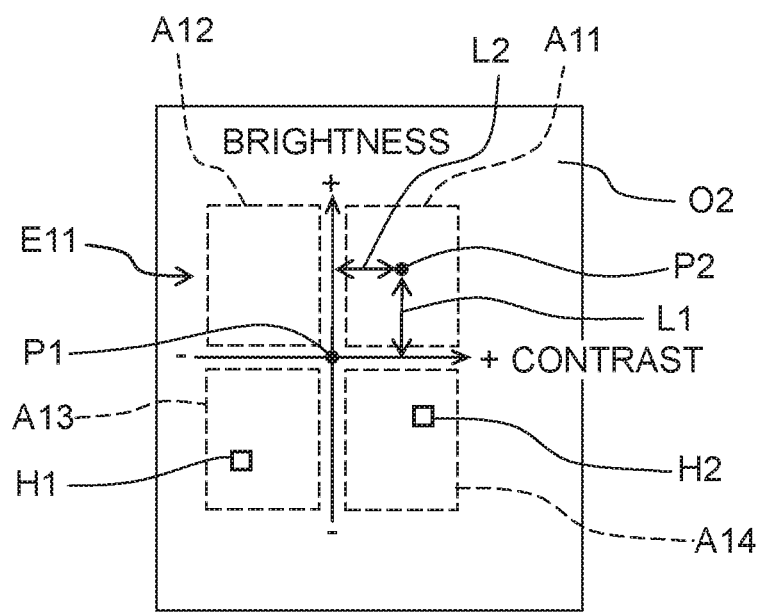
FIG. 11 depicts an exemplary display screen.

In the step S200, the CPU 11 performs image processing corresponding to an area that is within a display range of the object image and includes the second indication position. In the second embodiment, as depicted in FIG. 11, a case in which the second indication position P2 is in the first area A11 will be described. First, the CPU 11 refers to the setting table TB1 and performs the image processing to "increase" "brightness" of the object image O2 and the image processing to "increase" "contrast" of the object image O2. The increment of brightness is greater, as a distance L1 of the second indication position P2 in a vertical axis direction is longer. The increment of contrast is greater, as a distance L2 of the second indication position P2 in a horizontal axis direction is longer.

In the step S210, the CPU 11 controls the touch panel 20 to display an object image after image processing O2 instead of the object image before processing O2.

In the step S300, when the CPU 11 determines that the contact strength has exceeded the second threshold value (S300: YES), the CPU 11 determines that the predefined operation has been input and then proceeds to the step S305. In the step S305, when the CPU 11 determines that the indication position having accepted the predefined operation is different from the first indication position (S305: YES), the object image after image processing is stored in the storage section 12. In the second embodiment, as depicted in FIG. 11, when the CPU 11 determines that the contact strength at the second indication position P2 has exceeded the second threshold value (S300: YES and S305: YES), the object image O2, of which "brightness" and "contrast" have been changed (S210) based on the second indicated position P2, is stored (S310).

In the step S305, when the CPU 11 determines that the indication position having accepted the predefined operation is the first indication position P1 (S305: NO), the CPU 11 proceeds to the step S330. In the step S330, the CPU 11 changes setting contents of the setting change accepting area. In the step S340, the CPU 11 controls the touch panel 20 to display, in the object image O2, an editing guide image indicating kinds of image processing after change.

Figure 12:
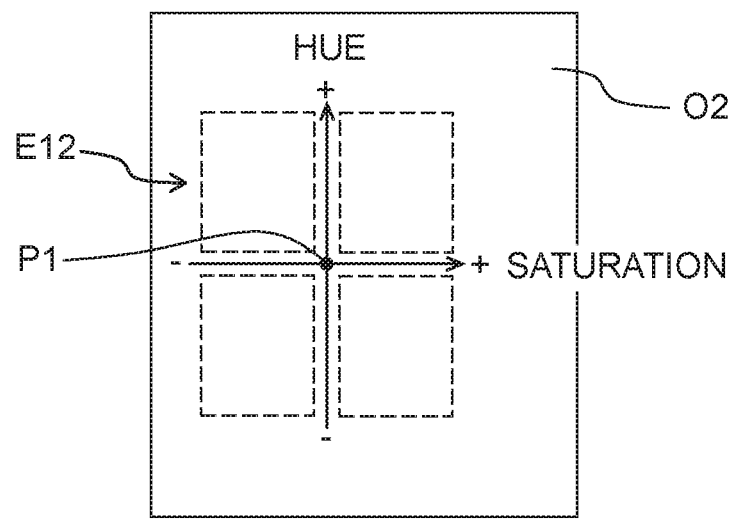
FIG. 12 depicts an exemplary display screen.

In the second embodiment, as depicted in FIG. 12, the vertical axis corresponds to image processing for "hue", which is the image processing after change, and the horizontal axis corresponds to image processing for "saturation", which is the image processing after change. Those new correspondence relations are stored in the setting table TB1 as described in the first embodiment. Then, an editing guide image after change E12 is displayed in the object image O2. The editing guide image E12 is displayed such that the center of the image of coordinate axes is coincident with the first indication position P1.

Third Embodiment

The third embodiment provides display modes of the object image and the editing guide image that are different from those of the first embodiment. The block diagram of the information processing apparatus 10 (FIG. 1) and the flow-chart (FIGS. 2 to 4) are common to the first embodiment and the third embodiment, any detailed explanation thereof will be omitted.

In the step S100, the object image is displayed. In the third embodiment, similar to the second embodiment, the entire area of the processing target image displayed in the display area G2 is regarded as the object image.

In the step S175, the CPU 11 sets the setting change accepting area. In the step S180, the CPU 11 controls the touch panel 20 to display an editing guide image E21 and an operation guide image E31 in the object image O2. A detailed explanation thereof will be made with reference to FIG. 13. The editing guide image E21 includes a contact strength meter image. The editing guide image E21 may be displayed in a position distant from the first indication position P1. An arrow image R1, which indicates a current contact strength in the first indication position P1, is displayed in the contact strength meter image. The arrow image R1 is displayed at a lower side of the contact strength meter as the contact strength is greater. The contact strength meter image corresponds to the image processing for "brightness" so that brightness increases as the contact strength is greater. This correspondence relation is stored in the setting table TB1 as described in the first embodiment. Further, an indication image R2 is displayed in the contact strength meter image. The indication image R2 indicates a setting value for brightness of the object image before image processing O2.

The operation guide image E31 represents that an operation for deciding the content of image processing is input (S300: YES) by inputting a drag operation moving in a downward arrow direction while maintaining the contact of the indication object with the first indication position P1. Further, the operation guide image E31 represents that processing for changing the content of image processing (S330) is performed by inputting a drag operation moving in an upward arrow direction while maintaining the contact of the indication object with the first indication position P1.

In the step S200, the CPU 11 performs image processing for adjusting brightness of the object image O2 so that the object image O2 has brightness corresponding to the contact strength indicated by the arrow image R1. In the step S210, the CPU 11 displays an object image after image processing O2 instead of the object image before processing O2.

In the step S300, when the CPU 11 has detected that the drag operation moving from the first indication position P1 as a start point in the downward arrow direction has been input (S300: YES), the CPU 11 determines that the decision operation has been input and then proceeds to the step S310. In the second embodiment, a case in which the drag operation moving in the downward arrow direction has been input in the state of FIG. 13 will be described. In that case, the object image O2 which has been changed to have "brightness" indicated by the arrow image R1 (S210) is stored (S310).

In the step S300, when the CPU 11 has detected that the drag operation moving from the first indication position P1 as the start point in the upward arrow direction has been input (S300: NO), the CPU 11 proceeds to the step S330. In the second embodiment, a case in which the drag operation moving in the upward arrow direction has been input in the state of FIG. 13 will be described. In that case, the contact strength meter image corresponds to image processing different from "brightness", such as contrast change. The new correspondence relation is stored in the setting table TB1 as described in the first embodiment. Then, an editing guide image after change E21 is displayed in the object image O2 (S340). In this situation, the CPU 11 may proceed to contrast change processing in a state where brightness of the object image O2 has been changed to that indicated by the arrow image R1 (S210).

<Effect of Third Embodiment>

Figure 13:
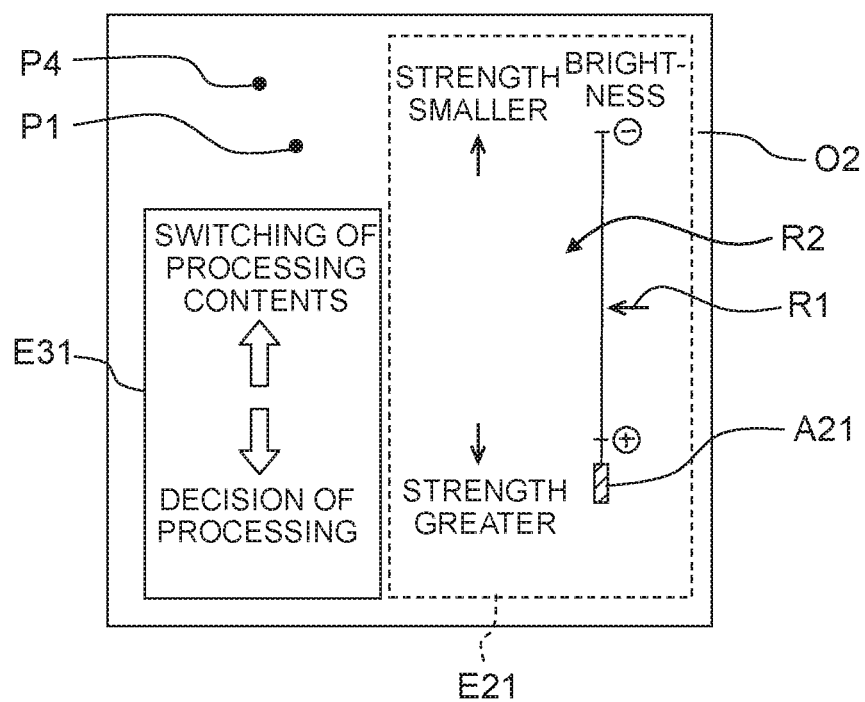
FIG. 13 depicts an exemplary display screen.

The setting value may be changed (S200) depending on the contact strength of the indication object. Thus, the information processing apparatus 10 may accept input of the operation for changing the setting value for image processing during the series of operations starting from contact of the indication object and ended with separation of the indication object. Namely, when the user desires to make the object image O2 brighter than the current state thereof in a state where the screen of FIG. 13 is displayed (S180), the user is only required to increase the contact pressure of the indication object so that the arrow image R1 moves downward further than the indication image R2. When the user desires to make the object image O2 darker than the current state thereof, the user is only required to reduce the contact strength of the indication object so that the arrow image R1 moves upward further than the indication image R2. This enables the user to input the operation easily and conveniently.

The user may store the object image after image processing in the storage section 12 (S310) by changing the setting value depending on the contact strength of the indication object (S200) and then moving the indication object downward while maintaining the contact of the indication object with the touch panel 20. The user may change the kind of image processing (S330) by moving the indication object upward while maintaining the contact of the indication object with the touch panel 20. In other words, the information processing apparatus 10 may accept input of the decision operation and input of the operation for switching kinds of selectable image processing (S330) during the series of operations starting from contact of the indication object and ended with separation of the indication object. This enables the user to input the operation easily and conveniently.

Fourth Embodiment

Figure 14:
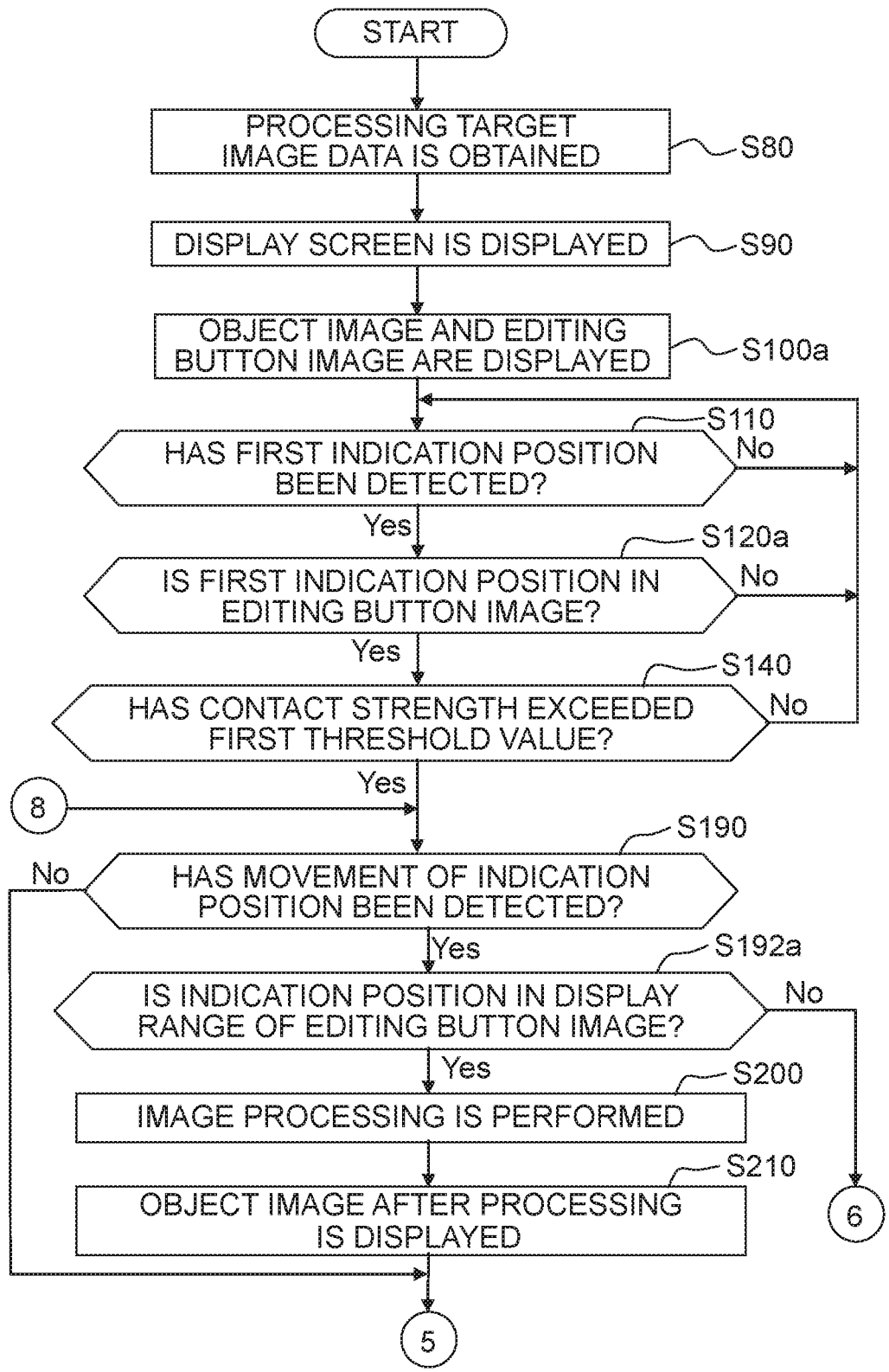
FIG. 14 is a flowchart indicating an operation of the information processing apparatus.
Figure 15A:
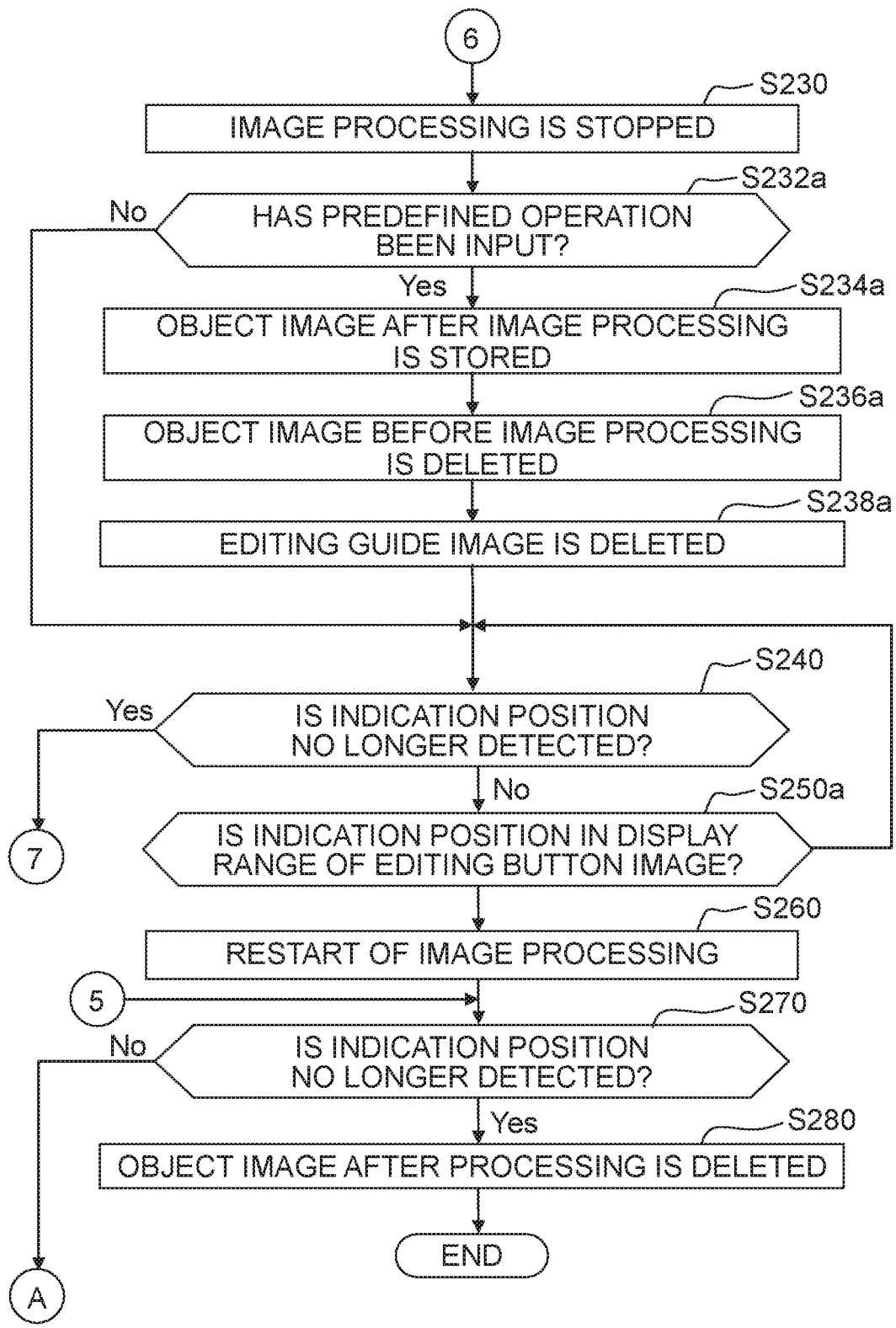
FIGS. 15A and 15B are flowcharts indicating a continuation of the operation of the information processing apparatus.
Figure 15B:
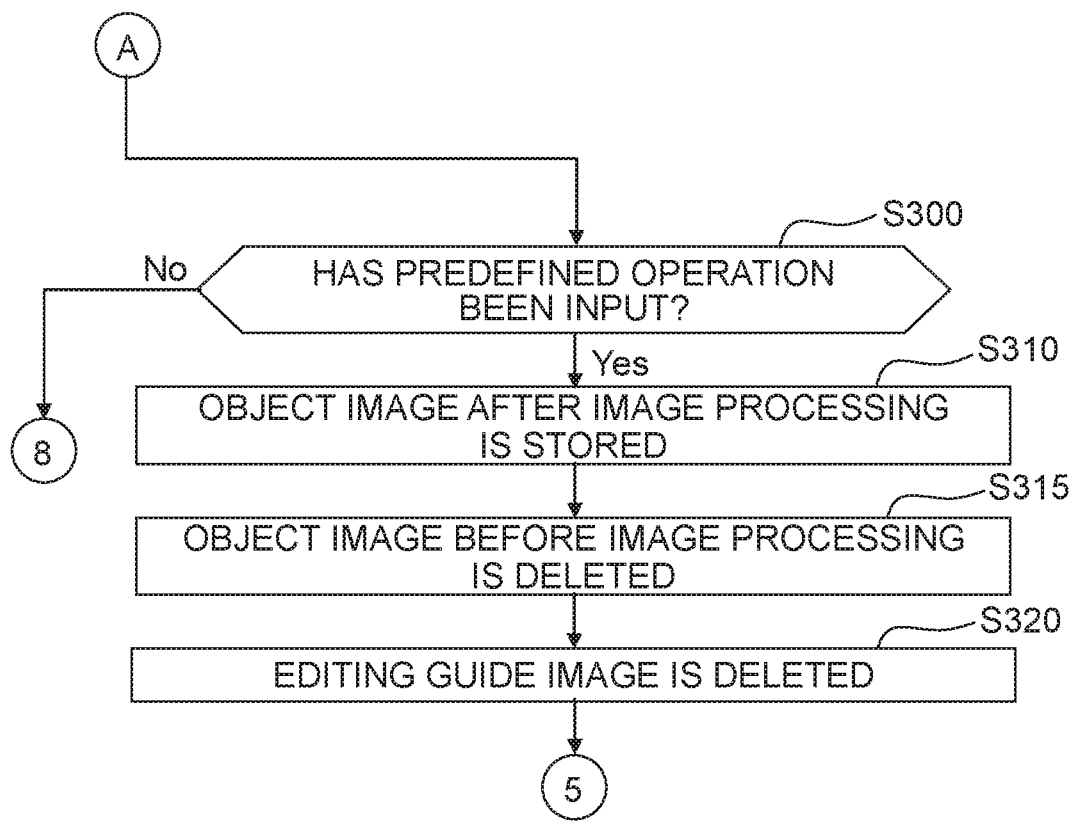

In a fourth embodiment, an editing button image for accepting input for image processing is displayed together with the object image. FIGS. 14, 15A and 15B depict a flowchart of the fourth embodiment. The flowchart depicted in FIGS. 14, 15A and 15B is partially modified from the flowchart depicted in FIGS. 2 to 4 according to the first embodiment. Thus, contents of processing to which identical reference numerals are assigned are the same between FIGS. 2 to 4 and FIGS. 14, 15A and 15B, any explanation thereof will be omitted in some cases. In FIGS. 14, 15A and 15B, each of the steps assigned with a reference numeral with an alphabetic suffix "a" has been changed from that of the first embodiment. Thus, the following description focuses on each of the steps to which the alphabetic suffix "a" is added.

In a step S100a, the CPU 11 controls the touch panel 20 to display the object image and the editing button image in the processing target image M1. The editing button image accepts input of a command for performing image processing for the object image.

Figure 16:
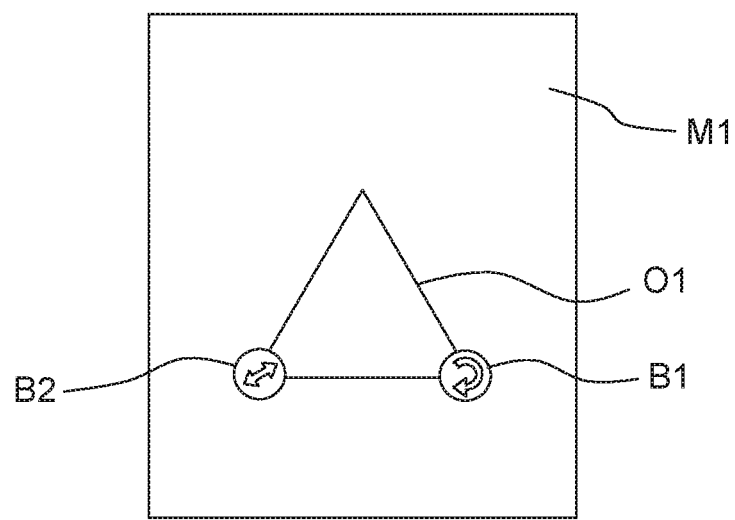
FIG. 16 depicts an exemplary display screen.

In FIG. 16, the object image O1 and editing button images B1, B2 are displayed. The editing button image B1 accepts input of a command for performing rotation processing. The object image O1 may be rotated to the right at a predefined speed while the editing button image B1 is being touched (S192a: YES). When one rotation to the right is completed, rotation processing may be switched to one rotation to the left. When the rotation angle of the object image from an initial display position has reached a predefined angle (e.g., 90° or 180°), rotation of the object image may be stopped for a given time (e.g., three seconds). Accordingly, the rotation angle of the object image O1 may be determined appropriately. The editing button image B2 accepts input of a command for performing enlargement/reduction processing. The object image O1 may be enlarged at a predefined speed while the editing button image B2 is being touched (S192a: YES). When the object image O1 has been enlarged up to a predefined magnification (e.g., 300%), enlargement processing may be switched to reduction processing. Or, for example, when the first indication position P1 has moved in a display range of the editing button image, image processing may be switched between enlarge processing and reduction processing depending on the movement direction. In particular, when the first indication position P1 has moved rightward (or upward), enlargement processing may be performed; when the first indication position P1 has moved leftward (or downward), reduction processing may be performed. Accordingly, input of multiple kinds of processing including the enlargement processing and reduction processing may be accepted by the single editing button image B2.

In a step S120a, the CPU 11 determines whether or not the detected first indication position P1 is in the display range of the editing button image. The determination is made by using a coordinate value of the first indication position P1 and a coordinate value of the editing button image. When the CPU 11 determines that the detected first indication position P1 is not in the display range of the editing button image (S120a: NO), the CPU 11 returns to the step S110. When the CPU 11 determines that the detected first indication position P1 is in the display range of the editing button image (S120a: YES), the CPU 11 proceeds to the step S140.

In a step S192a, the CPU 11 determines whether or not the second indication position is in the display range of the editing button image. The determination is made by using a coordinate value of the second indication position and a coordinate value of the editing button image. When the CPU 11 determines that the second indication position is in the display range of the editing button image (S192a: YES), the CPU 11 proceeds to the step S200. When the CPU 11 determines that the second indication position is not in the display range of the editing button image (S192a: NO), the CPU 11 proceeds to the step S230.

The contents of steps S232a, S234a, S236a, and S238a are the same as those of the steps S300, S310, S315, and S320, respectively, and thus explanations thereof will be omitted. In a step S250a, the CPU 11 determines whether or not the indication position has been detected in the display range of the editing button image. The determination is made by using a coordinate value of the indication position and a coordinate value of the editing button image. When the CPU 11 determines that the indication position has not been detected in the display range of the editing button image (S250a: NO), the CPU 11 returns to the step S240. When the CPU 11 determines that the indication position has been detected in the display range of the editing button image (S250a: YES), the CPU 11 proceeds to the step S260.

<Effect of Fourth Embodiment>

The user may perform, for the object image, image processing corresponding to the editing button image contacting with the indication object (S200) by bringing the indication object into contact with the editing button image under a contact strength exceeding the first threshold value (S120a: YES and S140: YES). The user may decide the image processing for the object image (S310) by allowing the indication object to touch the touch panel 20 until the contact strength exceeds the second threshold value while maintaining the contact of the indication object with the touch panel 20 (S300: YES). The user may cancel the image processing for the object (S280) by separating the indication object from the touch panel 20 (S270: YES) after performing the image processing for the object image (S200), namely, by not allowing the indication object to touch the touch panel 20 until the contact strength exceeds the second threshold value (S300: NO). In other words, the information processing apparatus 10 may accept input of the start operation (S140: YES), the decision operation (S300: YES), and the cancel operation (S270: YES in a state of S300: NO) for image processing during the series of operations starting from contact of the indication object and ended with separation of the indication object. This enables the user to input the operation easily and conveniently.

The user may stop image processing (S230) by moving the indication object to the outside of the display range of the editing button image (S192a: NO) while maintaining the contact of the indication object with the touch panel 20 during a period in which the object image is being subjected to image processing (S200). After that, the user may restart image processing corresponding to the editing button image to which the command by use of the indication object has been performed (S260) by moving the indication object into the display range of the editing button image (S250a: YES) while maintaining the contact of the indication object with the touch panel 20. This enables the user to input the operation easily and conveniently.

Embodiments of the present teaching have been described above in detail. The embodiments, however, are merely examples and do not limit the following claims. Technology described in the following claims includes various modifications of the above-described embodiments. Modified embodiments of the embodiments will be described below.

First Modified Embodiment

Input of the decision operation in the second embodiment (S300) may be performed in various manners. When a fourth indication position different from the first indication position has been detected in the touch panel 20 during a period in which the first indication position P1 is being detected, the CPU 11 may determine in S300 that input of the predefined operation has been detected. For example, a case in which not only the first indication position P1 but also a fourth indication position P4 have been detected in the state of FIG. 13 will be described. In that case, the object image O2 is changed (S210) to have "brightness" indicated by the arrow image R1 at a point in time at which the fourth indication position P4 has been detected. Then, an object image after change O2 is stored (S310).

Accordingly, the user may adjust brightness of the object image O1 (S200) by adjusting, for example, the contact pressure of his/her first finger with respect to the first indication position P1. After adjusting brightness, the user may decide the brightness (S310) by touching any position of the touch panel 20 with his/her second finger (S300: YES).

Second Modified Embodiment

The editing guide image displayed in the step S180 of the second embodiment may appear as various images. For example, in addition to the editing guide image E11 depicted in FIG. 11, a button-like editing guide image may be further displayed. The button-like editing guide image may previously correspond to a preset setting value of "brightness" and a preset setting value of "contrast". Then, in the step S192, the CPU 11 may determine whether or not the second indication position is in the display range of the button-like editing guide image. Accordingly, image processing based on the preset setting value may be performed (S200) by moving the indication object to the button-like editing guide image (S192: YES).

Third Modified Embodiment

The editing guide image displayed in the step S180 of the second embodiment may include various images. For example, like the editing guide image E11 depicted in FIG. 11, the editing guide image may include history images H1 and H2. The history images H1 and H2 appear as points on the image of coordinate axes, and represent contents of image processing performed by the user in the past. This allows the user to visually recognize histories of image processing.

Fourth Modified Embodiment

In the second embodiment, the first indication position P1 may be positioned extremely close to a left frame line of the object image O2, as depicted in the left diagram of FIG. 17. In such a fourth modified embodiment, the indication object may be moved from the first indication position P1 to the second indication position P2 that is on the left of the frame line of the object image O2 (see an arrow Y3). In that case, as depicted in the right diagram of FIG. 17, a scroll display may be performed to move the object image O2 and the editing guide image E11 to the right in the display area G2 by a distance moving beyond the frame line. The area, of the object image O2, extending beyond the display area G2 is not displayed in the display area G2.

The first indication position P1 is more likely to be positioned in the vicinity of the frame line of the object image O2. This is because an important image, such as a person's face, is more likely to be disposed at the center of the object image O2. According to the configuration of the fourth modified embodiment, even when the first indication position P1 is positioned in the vicinity of the frame line of the object image O2, the frame line does not limit movement of the indication object. This enables the user to input the operation easily and conveniently.

Fifth Modified Embodiment

In the third embodiment, the content change processing (S330) for changing the content of image processing may be accepted in various manners. For example, in the editing guide image E21 depicted in FIG. 13, the contact strength meter image may include an area A21 for accepting the content change processing. When sensitivity of the contact strength meter is in a range of 0 to 100, the range from 0 to 90 may be assigned to accept change in the setting value of image processing and the range from 95 to 100 may be assigned to accept the content change processing. This enables the user to adjust "brightness" by adjusting the contact strength of the indication object in such a manner that the arrow image R1 moves in the sensitivity range of 0 to 90. Then, the user may adjust "contrast" by allowing the indication object to touch the touch panel 20 more strongly in such a manner that the arrow image R1 exceeds a sensitivity value of 95.

Other Modified Embodiments

In the above embodiments and modified embodiments, the object image is moved to follow the drag operation in the step S160. The present teaching, however, is not limited thereto. For example, the object image before movement may be deleted to display the object image at a position after movement. This reduces a burden of image processing on the information processing apparatus 10.

Processing of the steps S305, S330, and S340 may be omitted. In that case, when the predefined operation has been input (S300: YES), image processing for the object image is surely decided (S310).

The display modes of the display screens depicted in FIGS. 5 to 13, FIG. 16, and FIG. 17 are merely examples, and they may be any other display modes.

The technical elements described in the present description and drawings are intended to exert technical usability individually or by way of various combinations, and thus are not limited to any combinations set forth in the appended claims at the time of filing the present application. Further, the techniques exemplified in the present description and drawings are intended to achieve a plurality of purposes at the same time, and to gain the technical usability by achieving one of the purposes.

The panel 18 is an exemplary display. The CPU 11 is an exemplary computer. The image processing application 32 is an exemplary program. Each of the editing guide images E1, E11, and E21 is an exemplary first image. The image of coordinate axes is an example of an image indicating boundary lines.

What is claimed is:

1. A non-transitory recording medium storing a program which is to be executed on a computer of an information processing apparatus including a display and a touch panel, wherein the program causes the computer to:

control the display to display an object image as an editing target;

detect that an indication object is in contact with or has approached a display range of the object image, and cause the touch panel to detect a contact strength of the indication object and a first indication position having accepted the contact or the approach of the indication object;

control the display to display a first image representing multiple kinds of image processing to be performed for the object image, the first image being different from the object image, in response to the detected contact strength exceeding a first threshold value;

detect a positional movement of the first indication position, and designate at least one of the multiple kinds of image processing based on the positional movement in a state where the first image is displayed and the contact strength has exceeded the first threshold value;

perform the designated at least one image processing for the object image;

control the display to display an object image after being subjected to the designated at least one image processing;

detect, after detecting the positional movement and in a state where the contact strength has exceeded the first threshold value, whether or not a predefined operation has been input in a state where the contact or the approach of the indication object is being detected continuously;

in a case that the input of the predefined operation has been detected after detecting the positional movement, determine whether an indication position having accepted the predefined operation is different from the first indication position;

in a case that it is determined that the indication position having accepted the predefined operation is different from the first indication position and in a case that the designated at least one image processing has been performed, control a storage section to store the object image after being subjected to the at least one image processing designated by the input;

in a case that it is determined that the indication position of the having accepted the predefined operation is not different from the first indication position, change a first setting value for the at least one image processing designated by the input depending on the obtained contact strength, and the program causes the computer to execute, by use of a first setting value after change, the at least one image processing designated by the input; and in a case that the input of the predefined operation is not detected after detecting the positional movement and that the contact or the approach of the indication object with respect to the touch panel is no longer detected without detecting the input of the predefined operation, the program causes the computer to control the display to eliminate the first image and the object image after being subjected to the designated at least one image processing.

2. The recording medium according to claim 1, wherein in a case that a contact strength exceeding the first threshold value is not detected after the first indication position has been detected, and that the indication object has moved to a third indication position while maintaining the contact or the approach with respect to the touch panel, the program causes the computer to control the touch panel to detect the third indication position; and in a case that the third indication position has been detected, the program causes the computer to move the object image from a position based on the first indication position to a position based on the third indication position.

3. The recording medium according to claim 1, wherein in the case that the touch panel has detected that the contact strength has exceeded the first threshold value, the program causes the computer to set a first area corresponding to first image processing and a second area corresponding to second image processing in an area surrounding the first indication position;

in a case that the indication object has moved to a second indication position while maintaining the contact or the approach with respect to the touch panel after a contact strength exceeding the first threshold value has been detected, the program causes the computer to control the touch panel to detect the second indication position; and in a case that the second indication position is in the first area, the program causes the computer to execute the first image processing as the at least one image processing designated by the input; and in a case that the second indication position is in the second area, the program causes the computer to execute the second image processing as the at least one image processing designated by the input.

4. The recording medium according to claim 3, wherein the multiple kinds of image processing include a first kind of image processing and a second kind of image processing different from the first kind of image processing;

in a case that the first area and the second area are set, the program causes the computer to create a correspondence relation between a first setting value for the first kind of image processing and the first area as well as a correspondence relation between a second setting value for the first kind of image processing and the second area, the program causes the computer to detect whether or not the contact strength in the first indication position has exceeded a second threshold value different from the first threshold value; and in a case that the touch panel has detected that the contact strength has exceeded the second threshold value, the program causes the computer to create a correspondence relation between a first setting value for the second kind of image processing and the first area as well as a correspondence relation between a second setting value for the second kind of image processing and the second area.

5. The recording medium according to claim 3, wherein in a case that the first area and the second area are set, the program causes the computer to set the first area and the second area in the display range of the object image;

in a case that the touch panel has detected that the second indication position is positioned outside the display range of the object image, the program causes the computer to stop the first image processing;

in a case that the touch panel has detected that the second indication position is positioned in the first area within the display range of the object image after the at least one image processing designated by the input has been stopped, the program causes the computer to restart the first image processing as the at least one image processing designated by the input; and in a case that the touch panel has detected that the second indication position is positioned in the second area within the display range of the object image after the at least one image processing designated by the input has been stopped, the program causes the computer to restart the second image processing as the at least one image processing designated by the input.

6. The recording medium according to claim 3, wherein the first image includes an image representing a boundary line between the first area and the second area;

in the case that the second indication position is in the first area, the program causes the computer to change a first setting value for the first image processing depending on a distance between the second indication position and the first indication position and then executes the at least one image processing designated by the input by use of a first setting value after change; and in the case that the second indication position is in the second area, the program causes the computer to change a second setting value for the second image processing depending on the distance between the second indication position and the first indication position and then executes the at least one image processing designated by the input by use of a second setting value after change.

7. The recording medium according to claim 6, wherein the boundary line is displayed to pass through the first indication position.

8. The recording medium according to claim 3, wherein in a case that the contact strength has exceeded the second threshold value different from the first threshold value, the program causes the computer to determine that the predefined operation has been input.

9. The recording medium according to claim 1, wherein in a case that the indication object has moved from the first indication position while maintaining the contact or the approach with respect to the touch panel, the program causes the computer to determine that the predefined operation has been input.

10. The recording medium according to claim 9, wherein the first setting value includes a first kind of first setting value for a first kind of image processing and a second kind of first setting value for a second kind of image processing different from the first kind of image processing;
   in a case that the indication object has moved from the first indication position in a first direction while maintaining the contact or the approach with respect to the touch panel, the program causes the computer to determine that the predefined operation has been input; and
   in a case that the indication object has moved from the first indication position in a second direction different from the first direction while maintaining the contact or the approach with respect to the touch panel, the program causes the computer to determine that the first setting value for the at least one image processing designated by the input has been changed from the first kind of first setting value to the second kind of first setting value.

11. The recording medium according to claim 1, wherein the program causes the computer to determine whether or not a fourth indication position different from the first indication position has been detected by the touch panel during a period in which the first indication position is being detected; and
   in a case that it has been determined that the fourth indication position has been detected, the program causes the computer to determine that the predefined operation has been input.

12. The recording medium according to claim 1, wherein the program causes the computer to control the display to display the object image after being subjected to the at least one image processing designated by the input to overlap it with the object image before being subjected to the at least one image processing designated by the input.

13. A non-transitory recording medium storing a program which is to be executed on a computer of an information processing apparatus including a display and a touch panel, wherein the program causes the computer to:
   control the display to display an object image as an editing target and a first image through which input designating multiple kinds of image processing to be performed for the object image is accepted, the first image being different from the object image;
   detect that an indication object is in contact with or has approached a display range of the first image, and control the touch panel to detect a contact strength of the indication object and a first indication position having accepted the contact or the approach of the indication object;
   detect a positional movement of the first indication position, and designate at least one of the multiple kinds of image processing based on the positional movement in a state where the contact strength has exceeded the first threshold value;
   perform the designated at least one image processing for the object image;
   control the display to display an object image after being subjected to the designated at least one image processing;
   detect, after detecting the positional movement and in a state where the contact strength has exceeded the first threshold value, whether or not a predefined operation has been input in a state where the contact or the approach of the indication object is being detected continuously;
   in a case that the input of the predefined operation has been detected after detecting the positional movement, determine whether an indication position having accepted the predefined operation is different from the first indication position;
   in a case that it is determined that the indication position having accepted the predefined operation is different from the first indication position and in a case that the designated at least one image processing has been performed, control a storage section to store the object image after being subjected to the at least one image processing designated by the input;
   in a case that it is determined that the indication position of the having accepted the predefined operation is not different from the first indication position, change a first setting value for the at least one image processing designated by the input depending on the obtained contact strength, and the program causes the computer to execute, by use of a first setting value after change, the at least one image processing designated by the input; and
   in a case that the input of the predefined operation is not detected after detecting the positional movement and that the contact or the approach of the indication object with respect to the touch panel is no longer detected without detecting the input of the predefined operation, the program causes the computer to control the display to eliminate the first image and the object image after being subjected to the designated at least one image processing.

14. The recording medium according to claim 13, wherein in a case that the contact strength has exceeded a second threshold value different from the first threshold value, the program causes the computer to determine that the predefined operation has been input.

15. The recording medium according to claim 13, wherein in a case that the indication object has moved to a second indication position while maintaining the contact or the approach with respect to the touch panel after a contact strength exceeding the first threshold value has been detected, the program causes the computer to control the touch panel to detect the second indication position;
   in a case that the touch panel has detected that the second indication position is positioned outside a display range of the first image, the program causes the computer to stop the at least one image processing designated by the input; and
   in a case that the touch panel has detected that the second indication position is positioned in the display range of the first image after the at least one image processing designated by the input has been stopped, the program causes the computer to restart the at least one image processing designated by the input.

16. The recording medium according to claim 13, wherein the program causes the computer to execute the at least one image processing designated by the input, in which the object image is rotated in a predefined direction at a predefined speed, during a period in which the first indication position is in the display range of the first image, and in a case that a rotation angle of the object image from an initial display position reaches a predefined angle, the program causes the computer to stop the rotation of the object image for a certain period of time.

17. An information processing apparatus, comprising:
a display;
a touch panel; and
a controller configured to:
control the display to display an object image as an editing target;
detect that an indication object is in contact with or has approached a display range of the object image, and control the touch panel to detect a contact strength of the indication object and a first indication position having accepted the contact or the approach of the indication object;
control the display to display a first image representing multiple kinds of image processing to be performed for the object image, the first image being different from the object image, in response to the detected contact strength exceeding a first threshold value;
detect a positional movement of the first indication position, designate at least one of the multiple kinds of image processing based on the positional movement in a state where the first image is displayed and the contact strength has exceeded the first threshold value;
perform the designated at least one image processing for the object image;
control the display to display an object image after being subjected to the designated at least one image processing;
detect, after detecting the positional movement and in a state where the contact strength has exceeded the first threshold value, whether or not a predefined operation has been input in a state where the contact or the approach of the indication object is being detected continuously;
in a case that the input of the predefined operation has been detected after detecting the positional movement, determine whether an indication position having accepted the predefined operation is different from the first indication position;
in a case that it is determined that the indication position having accepted the predefined operation is different from the first indication position and in a case that the designated at least one image processing has been performed, control a storage section to store the object image after being subjected to the at least one image processing designated by the input;
in a case that it is determined that the indication position of the having accepted the predefined operation is not different from the first indication position, change a first setting value for the at least one image processing designated by the input depending on the obtained contact strength, and the program causes the computer to execute, by use of a first setting value after change, the at least one image processing designated by the input; and
in a case that the input of the predefined operation is not detected after detecting the positional movement and that the contact or the approach of the indication object with respect to the touch panel is no longer detected without detecting the input of the predefined operation, the program causes the computer to control the display to eliminate the first image and the object image after being subjected to the designated at least one image processing.

18. An information processing apparatus comprising:
a display;
a touch panel; and
a controller configured to:
control the display to display an object image as an editing target and a first image through which input designating multiple kinds of image processing to be performed for the object image is accepted, the first image being different from the object image;
detect that an indication object is in contact with or has approached a display range of the first image, and control the touch panel to detect a contact strength of the indication object and a first indication position having accepted the contact or the approach of the indication object;
detect a positional movement of the first indication position, and designate at least one of the multiple kinds of image processing based on the positional movement in a state where the contact strength has exceeded the first threshold value;
perform the designated at least one image processing for the object image;
control the display to display an object image after being subjected to the designated at least one image processing;
detect, after detecting the positional movement and in a state where the contact strength has exceeded the first threshold value, whether or not a predefined operation has been input in a state where the contact or the approach of the indication object is being detected continuously;
in a case that the input of the predefined operation has been detected after detecting the positional movement, determine whether an indication position having accepted the predefined operation is different from the first indication position;
in a case that it is determined that the indication position having accepted the predefined operation is different from the first indication position and in a case that the designated at least one image processing has been performed, control a storage section to store the object image after being subjected to the at least one image processing designated by the input;
in a case that it is determined that the indication position having accepted the predefined operation is not different from the first indication position, change a first setting value for the at least one image processing designated by the input depending on the obtained contact strength, and the program causes the computer to execute, by use of a first setting value after change, the at least one image processing designated by the input; and
in a case that the input of the predefined operation is not detected after detecting the positional movement and that the contact or the approach of the indication object with respect to the touch panel is no longer detected without detecting the input of the predefined operation, the program causes the computer to control the display to eliminate the first image and the object image after being subjected to the designated at least one image processing.

* * * * *

UNITED STATES PATENT AND TRADEMARK OFFICE
CERTIFICATE OF CORRECTION

PATENT NO. : 10,921,923 B2
APPLICATION NO. : 15/420141
DATED : February 16, 2021
INVENTOR(S) : Shintaro Kunimoto et al.

Page 1 of 1

It is certified that error appears in the above-identified patent and that said Letters Patent is hereby corrected as shown below:

In the Claims

Column 19, Claim 1, Line 14 should read:
position having accepted the predefined opera- Column 22, Claim 13, Line 24 should read:
having accepted the predefined operation is not Column 23, Claim 17, Line 54 should read:
having accepted the predefined operation is not Signed and Sealed this
Third Day of August, 2021

Drew Hirshfeld
*Performing the Functions and Duties of the
Under Secretary of Commerce for Intellectual Property and
Director of the United States Patent and Trademark Office*